April 8, 1952 P. J. BLAIS 2,592,382
ADJUSTABLE MILLING CUTTER
Filed March 6, 1947

Inventor:
Phillipe J. Blais.
by Charles F. Osgood,
Attorney.

Patented Apr. 8, 1952

2,592,382

UNITED STATES PATENT OFFICE 2,592,382

ADJUSTABLE MILLING CUTTER

Phillipe J. Blais, Claremont, N. H.

Application March 6, 1947, Serial No. 732,858

14 Claims. (Cl. 29—103)

This invention relates to adjustable cutters and more particularly to an improved adjustable dual type milling cutter embodying a pair of coacting, flanged, rotary cutters having parallel rows of cutter teeth on the flange-peripheries, and adjustable means for preventing the stresses imposed on said cutters in the milling of deep slots from causing the flanges of such cutters to spring toward one another to bring the rows of cutter teeth out of parallelism and fail to form a slot of full width at its bottom.

Conventional dual type milling cutters commonly comprise a pair of coacting cutter wheels each having a hub, a flange or web portion and a circular row of cutting teeth, either of solid or the inserted type, carried about the flange-peripheries, and the cutting teeth of the cutters ofttimes overlap each other when the cutters are positioned on the machine spindle, and, when the adjacent surfaces of the wheel-hubs are in contact with each other, there is end clearance between the teeth on each cutter and the most adjacent portion of the surface of the other cutter. With conventional cutters of this kind, when a deep slot is milled, there is frequently so much inward deflection by springing of the cutter flange portions supporting the cutting teeth that it is impossible to hold the full width of the slot to the bottom thereof.

Moreover, in rotary milling cutters of the dual cutter type having parallel rows of either solid or inserted cutting teeth, it has heretofore been common practice, when the cutting teeth become worn, to resharpen the teeth by grinding and to place spacing shims between the cutter hubs to position the cutters axially apart on the machine spindle to obtain the desired cutting width. It has also been found that in such resharpened cutters, particularly in those of comparatively large diameters, that the circular rows of spaced apart cutting teeth, spaced radially from the cutter hubs on the flange-peripheries, tend to deflect inwardly by springing toward one another during the milling operation so that when the cut deepens, the deflected cutting teeth cause the cut to narrow or taper inwardly at the bottom, frequently necessitating costly recutting to obtain the desired accuracy. Also, in narrow milling cutters, when the cutting teeth become appreciably worn, the cutters are ofttimes discarded, necessitating costly replacement.

The present invention, from a broad aspect, contemplates the provision of a dual milling cutter and adjusting means intermediate the cutters whereby the cutters may be relatively axially adjusted on the machine spindle to locate the parallel rows of cutting teeth at the desired cutting width. From a more specific aspect, the invention contemplates the placing of a pair of worn and resharpened single milling cutters of narrow width together to provide a dual cutter and having adjustable means carried by the cutters and engaging one another for rigidly holding the cutters in the desired axial relation on the machine spindle. From a still more specific aspect, the invention contemplates the provision of an improved adjustable milling cutter of the large diameter dual type having either solid or inserted teeth for cutting relatively deep slots or grooves and having improved adjusting devices carried by the cutters just inside of the cutting teeth in adjacency to the cutter peripheries for rigidly laterally supporting the parallel rows of cutting teeth to prevent inward deflection by springing, thereby to effect cutting of the slot or groove to the desired depth without tapering, and so eliminating the expense of recutting. From still another aspect, the invention may consist of dual milling cutters of the inserted tooth type, wherein instead of separately adjusting all the inserted teeth, the tooth inserts, when worn, may simply be sharpened by grinding, and shims may then be inserted between the wheel hubs on the machine spindle and the cutter wheels firmly held in adjusted position by the adjusting devices, and thus obtain the desired width of cut.

It is accordingly an object of the present invention to provide an improved adjustable milling cutter whereby the accurate cutting of relatively deep slots or grooves is possible. Another object is to provide an improved dual milling cutter having improved means for preventing springing of the spaced portions of the cutters which support the cutting teeth, so that when a deep slot is milled, the width of the slot is maintained substantially uniform to the very bottom thereof. Still another object is to provide an improved dual type milling cutter having improved adjusting means whereby the parallel rows of cutting teeth may be relatively axially adjusted on the machine spindle to obtain the desired cutting width. A further object is to provide improved adjusting means for a pair of relatively narrow, worn and resharpened milling cutters whereby the cutters may be placed together to provide a dual cutter, thereby avoiding the discarding of the worn single cutters. A still further object is to provide an improved adjustable milling cutter comprising a pair of coacting parallel cutters of relatively large diameters and having adjustable means carried by the cutters just inside of the cutting teeth in adjacency to the cutter peripheries for rigidly supporting the cutting teeth in parallel relation, thereby preventing inward deflection of the parallel rows of cutters during the cutting operation. Yet another object is to provide an improved adjustable milling cutter of the dual cutter type having adjusting screws located on the cutters just inside of the cutting teeth for rigidly supporting the cutting teeth in fixed parallel relation. A still further object is to provide improved adjusting means for a pair of interlocking dual milling cutters. These and other objects and advantages of the invention will, however, hereinafter more fully appear.

In the accompanying drawing there is shown for purposes of illustration one form which the invention may assume in practice.

Figure 1:
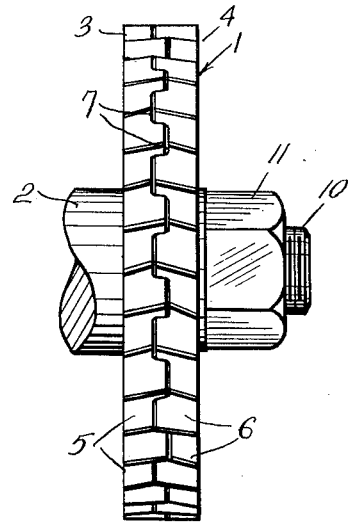
Fig. 1 is a side elevational view of an adjustable milling cutter constructed in accordance with an illustrative embodiment of the invention, and showing the cutter mounted on the machine spindle.
Figure 2:
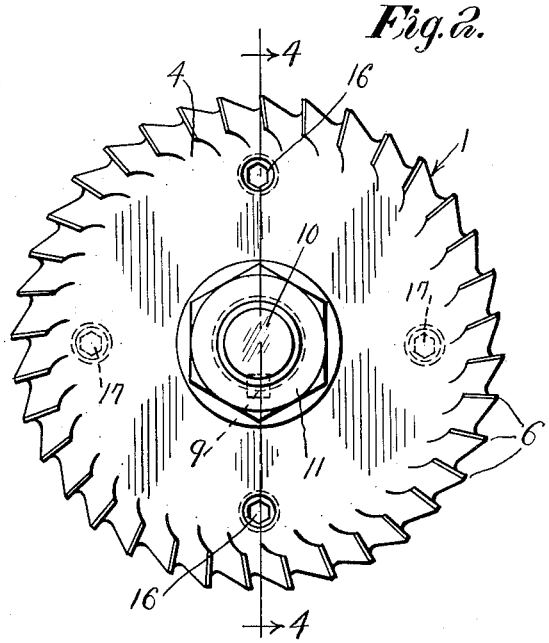
Fig. 2 is an outer end elevational view of the milling cutter shown in Fig. 1, looking toward the outer end of the machine spindle.
Figure 3:
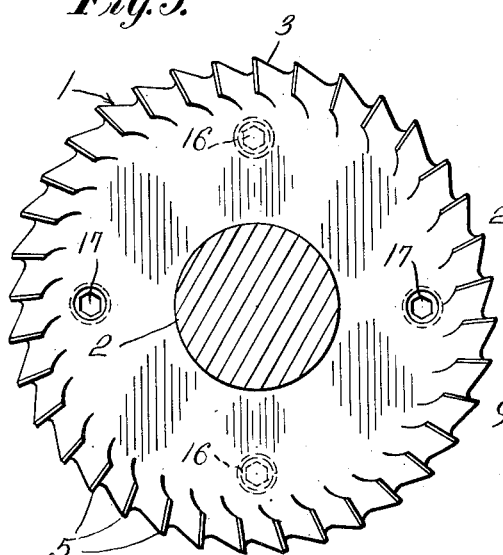
Fig. 3 is an inner end elevational view of the improved milling cutter, showing the machine spindle in cross section.

In this illustrative embodiment of the invention, there is shown an adjustable milling cutter, generally designated 1, of an improved design mounted on a conventional machine spindle 2 by which the milling cutter is driven. The milling cutter shown herein is of the adjustable dual type comprising a pair of identical cutter wheels 3 and 4, respectively having circular rows of cutting teeth 5 and 6 arranged in parallel relation and interlocked together at 7. The cutter wheels have hubs 8, 8 supported by the machine spindle and keyed at 9 to a reduced end portion 10 of the latter. The portion 10 of the spindle has threaded thereon a holding nut 11 for securing the cutter wheels against a shoulder 12 of the spindle. The cutting teeth may be of either the solid or inserted type, and the teeth, for illustrative purposes, are herein shown formed integral with the exterior peripheries of the radial flanges or web portions of the cutting wheels.

Figure 4:
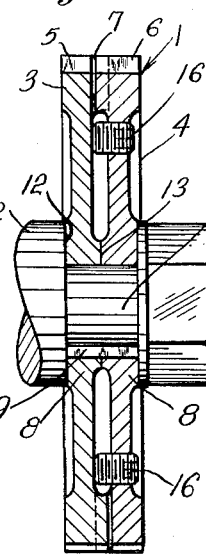
Fig. 4 is a vertical sectional view taken on line 4—4 of Fig. 2, showing a pair of new cutters with sharp cutting teeth arranged on the machine spindle with their hubs in end to end contact.

In Fig. 4 there is shown a pair of new milling cutters having sharp interlocking teeth and arranged on the machine spindle 2 with their hubs 8 arranged in end to end contact as at 13. In such new cutters, the interlocking teeth have slight clearances therebetween.

Figure 5:
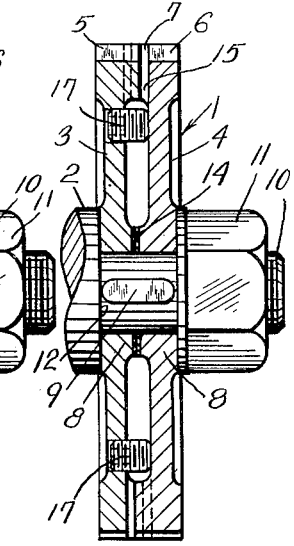
Fig. 5 is a sectional view taken through the milling cutter at right angles to Fig. 4 and turned through 90°, showing a pair of cutters with resharpened cutting teeth mounted on the machine spindle, with the cutter hubs axially spaced apart by shims.

Fig. 5 shows a pair of worn cutters which have had their cutting teeth resharpened as by grinding so that the hubs 8 of the cutting wheels are mounted on the machine spindle in axially spaced relation to obtain the desired width of cut, and the hubs are maintained apart by shims 14. The rows of peripheral cutting teeth are spaced a substantial distance apart, as shown at 15, so that in cutters of relatively large diameters, there is a tendency of the cutting teeth to deflect inwardly by springing during cutting, resulting in a narrowing or tapering cut, necessitating costly recutting to obtain the desired accuracy.

In this improved construction, there are provided pairs of set screws 16, 16 and 17, 17, herein preferably of the recessed head type, arranged in diametric lines in right angular relation with two set screws engaging the inner face of one cutter and the other two set screws engaging the inner face of the other cutter. The four set screws shown contact the cutting wheels just inside of the cutting teeth in adjacency to the wheel peripheries at four equally spaced points 90° apart so that the radial flanges or web portions which carry the rows of cutting teeth are rigidly held in parallel spaced apart relation, preventing inward deflection of the cutters while making a cut. By the arrangement of the set screws disclosed, the rows of cutting teeth are held in spaced apart parallel relation in an extremely rigid manner. If desired, in milling cutters of different diameters, a larger number of set screws may be employed. Obviously, the set screws lie within the limits of the parallel outer end faces of the cutting wheels and may enter the cut formed by the cutters without obstruction. Thus, by the provision of adjusting screws, the parallel rows of cutting teeth are held firmly in parallel relation so that a relatively deep slot or groove, without tapering, may be cut, thereby eliminating the expense of recutting to obtain the desired accuracy. Under certain conditions, it has been found that wedges may be inserted between the adjacent flanges of the cutter wheels, to hold the cutting teeth against lateral deflection, but such wedges lack the fineness and ease of adjustment of the set screws. Moreover, when the adjusting screws are applied to an old solid-tooth milling cutter, due to the hardness of the wheel-flanges, it may be necessary to drill the flanges and then insert threaded bushings in the holes so formed, for receiving the set screws. The threaded bushings may have inner collars which engage the inner surface of the flange which carries the bushings, so that when the set screws are adjusted, the bushing-collars react against the wheel flange. Such bushings are necessary because the metal of the cutter wheels is usually too hard to tap.

By the provision of the improved adjusting means between the parallel cutters, it is possible to adjust the cutters axially of the machine spindle accurately to obtain the desired cutting width. Also, by the use of the improved adjusting means, it is possible to use a pair of narrow worn cutters, which are usually discarded, as a dual cutter simply by grinding down the adjacent sides of the cutter hubs and placing the cutters together on the machine spindle. The adjusting screws permit the desired relative axial adjustment of the cutters and serve rigidly to hold the cutters in the desired position of adjustment. The adjusting screws may also be used with cutting wheels of the inserted tooth type equally as well as with the solid tooth type cutters shown and may, under certain conditions, be used with cutters which do not interlock. Further, with dual cutters of the inserted tooth type, instead of separately adjusting all the inserted teeth on the wheels, the tooth inserts, when worn, may simply be sharpened by grinding and shims may then be inserted between the wheel hubs on the machine spindle and the cutter wheels firmly held in adjusted position by the adjusting screws and thus obtain the desired width of cut.

As a result of this invention, an improved adjustable dual type milling cutter is provided which has its parallel rows of cutting teeth firmly held in parallel relation even after the cutting teeth have been resharpened by grinding, and the cutting wheels are spaced apart on the machine spindle to obtain the desired cutting width. It will be further evident that by the provision of the improved adjusting screws acting between the inner faces of the cutters, the cutting teeth may be readily adjusted apart to obtain the desired width of cut. Further, it will be noted that by locating the adjusting screws just inside of the cutting teeth in adjacency to the cutter peripheries, the parallel rows of cutting teeth are rigidly held in spaced apart relation, thereby to prevent inward deflection of the cutting teeth, enabling the cutting of a deep slot or groove without narrowing or tapering at the bottom. Also, the improved adjusting devices arranged in the manner disclosed enable the use of a pair of narrow worn cutters as a dual cutter simply by mounting the narrow cutters in parallel relation on the machine spindle, thereby avoiding the costly discarding of worn cutters. Moreover, by the provision of the improved adjustable means, it is possible to sharpen and reset a pair of inserted tooth cutters, without the necessity of separately adjusting all of the inserted teeth. The improved milling cutter structure is not only simple and rugged in design, well adapted to meet the most severe cutting conditions, but is also readily applicable with but slight change to cutters of a conventional design. Other advantages of the invention will be clearly apparent to those skilled in the art.

While there is in this application specifically described one form which the invention may assume in practice, it will be understood that this form of the same is shown for purposes of illustration and that the invention may be modified and embodied in various forms without departing from its spirit or the scope of the appended claims.

What I claim as new and desire to secure by Letters Patent is:

1. A milling cutter comprising a pair of coacting cutter wheels having circular rows of cutting teeth at their peripheries and mounted in spaced axial relation on a machine spindle with their hub portions secured to the latter, with said rows of teeth in parallel relation, and independently adjustable devices carried by said cutting wheels just inside of the cutting teeth in adjacency to the wheel peripheries and spaced outwardly from said hub portions, said devices acting between said wheels at spaced points thereabout for firmly holding the peripheral portions against inward lateral deflection thereby to maintain the rows of cutting teeth in parallel relation.

2. A milling cutter comprising a pair of coacting cutter wheels having peripheral cutting teeth arranged in interlocking relation, said wheels having hubs mounted in spaced axial relation on a machine spindle, and independently adjustable set screws carried by each cutter wheel and engaging the inner face of the coacting wheel at spaced points thereabout and spaced outwardly from the wheel-hubs for rigidly holding the peripheral portions against inward lateral deflection thereby to maintain said cutting teeth in parallel relation.

3. A milling cutter comprising a pair of coacting cutter wheels having circular rows of peripheral cutting teeth arranged in parallel spaced apart relation, said wheels having hubs and radial flanges supporting said teeth at their peripheries, said wheel hubs being mounted in axially spaced relation on a machine spindle, and independently adjustable elements carried by each cutter wheel and engaging the inner faces of the flanges of the cutter wheels just inside of the cutting teeth at points spaced outwardly from the hubs rigidly to hold said rows of teeth in parallel relation, thereby to prevent inward deflection of the portions of the wheels which support the cutting teeth.

4. A milling cutter comprising a pair of coacting cutter wheels mounted on a machine spindle with their hubs held in spaced relation axially of the spindle by spacing means, said cutters having parallel radial flanges projecting from their hubs and carrying circular rows of cutting teeth at their peripheries, said cutting teeth arranged in interlocking relation, and separate adjusting screws carried by the flange of each cutter wheel at spaced points thereabout spaced outwardly from the hubs and engaging the inner face of the flange of the other wheel near said interlocking teeth for rigidly holding the latter in parallel relation, thereby to prevent inward deflection of the portions of the wheel flanges which support the cutting teeth.

5. An adjustable milling cutter comprising a pair of cutter wheels arranged in axially spaced relation on a machine spindle and having hub portions, and independent adjusting screws carried by said wheels and acting therebetween at spaced points thereabout outwardly from the hub portions and in adjacency to the wheel peripheries for adjusting said wheels axially of the spindle without changing the angular relation of the wheels with respect to the spindle, and means for securing the hub-portions of said wheels in adjusted position on the spindle.

6. In combination, a pair of cutter wheels including hub portions, peripherally disposed circular rows of cutting teeth and web portions connecting said rows of cutting teeth with said hub portions, said web portions deflectable under the loads imposed on said teeth during cutting, and a plurality of means spaced radially from the axes of said wheels outwardly from the hubs thereof and independently adjustable as the distances between said hubs may be varied to provide in effect variable strut means near the peripheries of said wheels for preventing flexure of said web portions towards each other, thereby to maintain the cut effected by said wheels free of taper to substantial depths.

7. In combination, a pair of cutter wheels including hub portions, peripherally disposed circular rows of cutting teeth and web portions connecting said rows of cutting teeth with said hub portions, said teeth on said wheels interfitting with each other but with clearance between the end of each tooth and the most proximate portion of the surface of the other wheel when said hub portions are in contact with each other, and a plurality of separately adjustable means carried by at least one of said wheels and engageable with the other at spaced points thereabout spaced outwardly from said hub-portions for preventing the stresses set up in the milling of deep slots from forcing the teeth on either wheel into end contact with the surface of the other wheel.

8. In combination, a pair of coacting cutter wheels having hub portions, peripherally disposed circular rows of cutting teeth and web portions connecting said rows of cutting teeth with said hub portions, said teeth on said wheels interfitting with each other but with clearance between the end of each tooth and the most adjacent portion of the surface of the other cutter wheel when said hub portions are in contact with each other on a machine spindle, and a plurality of independently adjustable spacing means carried by at least one of said cutter wheels and spaced radially from said hub portion and at different positions about the wheel, said adjustable spacing means being engageable with said other cutter wheel at spaced points thereabout for preventing the stresses set up in the milling of deep slots from forcing the cutting teeth on either wheel into end contact with the adjacent surface portion of the other cutter wheel.

9. In combination, a pair of coacting cutter wheels having hub portions, peripheraly disposed circular rows of cutting teeth and web portions connecting said rows of cutting teeth with said hub portions, said teeth on said wheels interfitting with each other but with clearance between the end of each tooth and the most adjacent portion of the surface of the other cutter wheel when said hub portions are in contact with each other on a machine spindle, and a plurality of separately adjustable means on said cutter wheels at points spaced outwardly from said hub-portions near the wheel peripheries, certain of which are carried by one cutter wheel and the others of which are carried by the other cutter wheel, and arranged in staggered relation and each engageable with the other cutter wheel, for preventing the stresses set up in the milling of deep slots from forcing the cutting teeth on either wheel into end contact with the adjacent surface portion of the other cutter wheel.

10. An adjustable milling cutter comprising a pair of flanged cutter wheels having peripheral cutter teeth and arranged in axially spaced relation on and having hubs keyed to a machine spindle, independently adjustable abutment screws threaded in openings in the wheel flanges at points spaced outwardly from the hubs for relatively adjusting said wheels axially with respect to the spindle without relative rotation between said wheels and the spindle, said screws providing abutments for the inner faces of the wheel-flanges near the teeth of said wheels to prevent inward flexure of the portions of said wheels near their peripheries during the milling operation, and means for rigidly securing said wheels in their axially adjusted position on the spindle.

11. A dual milling cutter comprising a pair of coacting cutter wheels having parallel rows of peripheral cutting teeth arranged in interlocking relation for rotation in unison, said wheels having hubs mounted in spaced axial relation on a machine spindle, and independently adjustable abutment screws, each carried by one of said wheels and engaging the inner face of the coacting wheel at points spaced outwardly from said hubs in adjacency to the cutting teeth, for rigidly holding said wheels with said rows of cutting teeth in spaced parallel relation, said screws providing abutments engaging the inner faces of said wheels to prevent inward deflection of the peripheral portions which carry said cutting teeth out of parallelism during the milling operation and independently adjustable into relatively different positions to reduce drag.

12. A milling cutter comprising spaced parallel flanges carrying circular rows of peripheral cutter teeth, and separately adjustable devices carried by said flanges and engaging the inner faces of the flanges at spaced points about the cutter in adjacency to the peripheral cutter teeth and spaced outwardly from the cutter-hub for preventing inward deflection of the peripheral portions of the flanges during milling of a deep slot, thereby to avoid tapering at the bottom of the slot.

13. A dual milling cutter having spaced parallel circular flanges provided with peripheral cutter teeth, and independently adjustable set screws, each threaded within one cutter flange and abutting the inner face of the other flange, engaging the flanges at spaced points thereabout in adjacency to the peripheral cutter teeth and spaced outwardly from the cutter-hub for supporting said flanges against inward flexure during milling of a deep slot, thereby to prevent tapering at the bottom of the slot.

14. A dual milling cutter having spaced parallel circular flanges provided with peripheral cutter teeth, and arranged on and having its hub keyed to a machine spindle, and independently adjustable set screws, each threaded within one cutter flange and abutting the inner face of the other flange, engaging the flanges at spaced points thereabout in adjacency to the peripheral cutter teeth and spaced outwardly from the cutter-hub for supporting said flanges against inward flexure during milling of a deep slot, thereby to prevent tapering at the bottom of the slot, said screws being adjustable while said cutter remains keyed to the machine spindle.

PHILLIPE J. BLAIS.

REFERENCES CITED

The following references are of record in the file of this patent:

UNITED STATES PATENTS

| Number | Name | Date |
|---|---|---|
| 13,357 | Keeney | July 31, 1855 |
| 701,916 | Morrison | June 10, 1902 |
| 1,349,967 | Korff et al. | Aug. 17, 1920 |
| 1,410,350 | Smith | Mar. 21, 1922 |
| 2,204,945 | Parker | June 18, 1940 |
| 2,230,662 | Whitman | Feb. 4, 1941 |
| 2,385,010 | Lipani | Sept. 18, 1945 |

FOREIGN PATENTS

| Number | Country | Date |
|---|---|---|
| 15,992 | Norway | July 13, 1906 |
| 636,480 | Germany | Oct. 8, 1936 |